United States Patent
Poris

(10) Patent No.: US 6,700,670 B1
(45) Date of Patent: Mar. 2, 2004

(54) METHOD OF MEASURING DISHING USING RELATIVE HEIGHT MEASUREMENTS

(75) Inventor: Jaime Poris, Los Gatos, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 09/576,756

(22) Filed: May 23, 2000

(51) Int. Cl.$^7$ .......................... G01B 11/14; G01B 11/30; G01B 11/28; G01N 21/00

(52) U.S. Cl. .................... 356/625; 356/630; 356/237.4; 356/237.5; 356/600

(58) Field of Search ............................. 356/601, 625, 356/630, 237.4, 237.5, 602–624

(56) References Cited

U.S. PATENT DOCUMENTS

| | | | |
|---|---|---|---|
| 4,512,661 A | 4/1985 | Claus et al. | 356/351 |
| 5,314,843 A | 5/1994 | Yu et al. | 437/225 |
| 5,348,002 A | 9/1994 | Caro | 128/633 |
| 5,555,471 A | 9/1996 | Xu et al. | 356/357 |
| 5,604,591 A | 2/1997 | Kitagawa | 356/351 |
| 5,784,163 A | 7/1998 | Lu et al. | 356/351 |
| 5,872,629 A | 2/1999 | Colvard | 356/349 |
| 5,874,318 A | 2/1999 | Baker et al. | 438/8 |
| 5,914,782 A | 6/1999 | Sugiyama | 356/351 |
| 5,953,115 A | 9/1999 | Landers et al. | 356/237 |

(List continued on next page.)

FOREIGN PATENT DOCUMENTS

| | | |
|---|---|---|
| EP | 0 831 295 A1 | 3/1998 |
| EP | 0 982 774 A2 | 3/2000 |
| WO | WO 00/54325 | 9/2000 |

OTHER PUBLICATIONS

Makosch, G., "LASSI—a scanning differential ac interferometer for surface profile and roughness measurement" *SPIE* vol. 1009 (1988); pp. 244–253.

Azzam, R. et al., "Ellipsometry And Polarized Light" *Elsevier Science B.V.* (1977, 1987), pp. 282–287.

(List continued on next page.)

*Primary Examiner*—Frank G. Font
*Assistant Examiner*—Amanda Merlino
(74) *Attorney, Agent, or Firm*—Silicon Valley Patent Group LLP

(57) ABSTRACT

A metrology process, in accordance with the present invention, measures the dishing of a feature, such as a copper, aluminum, or tungsten metal line, with respect to another feature, such as a dielectric layer, that surround the first feature by measuring the relative heights of varying line widths of the first feature with respect to the second feature. The relative heights are adjusted to correspond to the actual dishing value using a calibration point of a calibration line width and a calibration dishing value. The metrology process is useful, for example, after the metal and dielectric materials undergo a polishing process, e.g., CMP, to approximately planarize the surface. The calibration data provides a dishing value at a specific, relatively, small line width. The relative heights of various line widths are measured on production substrates. These relative heights are plotted as a function of line width. The curve is then extrapolated to the line width used during calibration. The resultant curve is then shifted so that the line width used for calibration intersects the horizontal line running through the dishing value measured during calibration. The actual dishing values can then be read from the shifted curve. Values from the calibration line width to the widest feature measured can be obtained. In addition, different sets of calibration data may be generated based on different parameters used in the polishing process. The relative heights of the metal lines are measured using, e.g., a differential interferometer or a laser displacement sensor.

25 Claims, 7 Drawing Sheets

U.S. PATENT DOCUMENTS

| | | | |
|---|---|---|---|
| 5,983,167 A | 11/1999 | Ebisawa | 702/167 |
| 6,194,317 B1 | 2/2001 | Kaisaki et al. | 438/692 |
| 6,238,592 B1 | 5/2001 | Hardy et al. | 252/79.1 |
| 6,340,602 B1 | 1/2002 | Johnson et al. | 438/7 |
| 6,392,749 B1 | 5/2002 | Meeks et al. | 356/381 |
| 6,392,752 B1 | 5/2002 | Johnson | 356/511 |
| 6,568,290 B1 | 5/2003 | Poris | 73/866 |
| 2002/0174714 A1 | 11/2002 | McWaid et al. | 73/105 |

OTHER PUBLICATIONS

Fujiwara, H. et al., "Depth–profiles in compositionally–graded amorphous silicon alloy thin films analyzed by real time spectroscopic ellipsometry" *Elsevier Science S.A.* pp. 474–478 (1998).

Heavens, O.S., "Optical Properties of Thin Solid Films" *Dover Publications, Inc* .(1991), pp. 62–73.

Jennewin, H. et al., "Interferometrical Profilometry at Surfaces with Varying Materials" *SPIE* vol. 3677 (1999), pp. 1009–1016.

Kildemo, M. et al., "Measurement of the absorption edge of thick transparent substrates using the incoherent reflection model and spectroscopic UV—visible—near IR ellipsometry" *Elsevier Science S.A.* pp. 108–113 (1998).

Kim, Gee–Hong et al., "White light scanning interferometry for thickness measurement of thin film layers" *SPI* vol. 3783 (1999), pp. 239–246.

Makosch, G. et al., "Surface profiling by electro–optical phase measurements" *SPIE* vol. 316 (1981); pp. 42–53.

"Numerical Recipes, The Art of Scientific Computing" by Press, Flannery, Teukolsky and Vetterling, published by Cambridge University Press 1988, 3.2 Rational Function Interpolation and Extrapolation, pp. 83–85.

Malacara, Daniel et al. "Interferogram Analysis for Optical Testing" 1998, Marcel Dekker, Inc. pp. 113.

Stine, B. et al., "Rapid Characterization and Modeling of Pattern–Dependent Variation in Chemical–Mechanical Polishing", IEEE Transactions on Semiconductor Manufacturing, vol. 11, No. 1, pp. 129–140 (Feb, 1998).

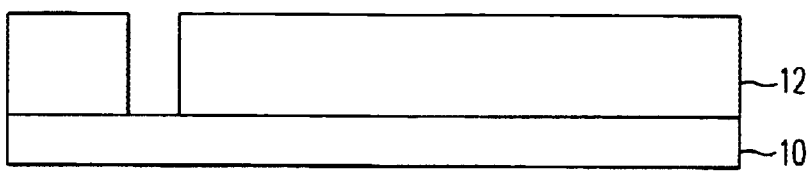
FIG. 1A
(Conventional)
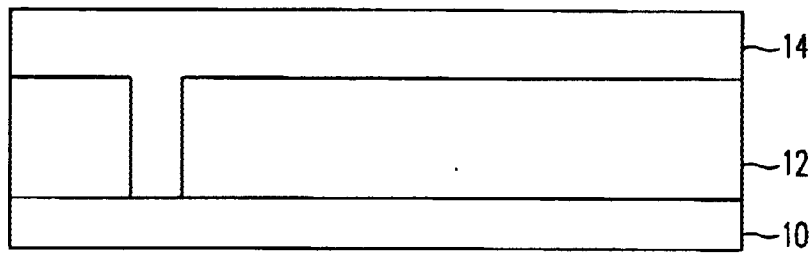
FIG. 1B
(Conventional)
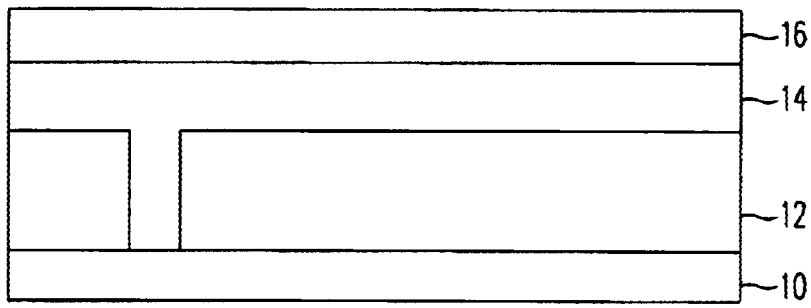
FIG. 1C
(Conventional)
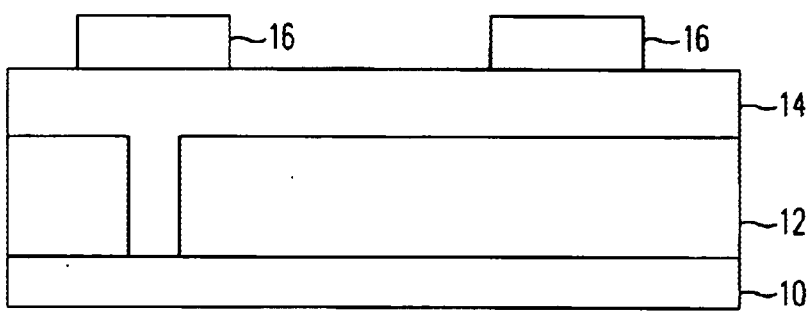
FIG. 1D
(Conventional)
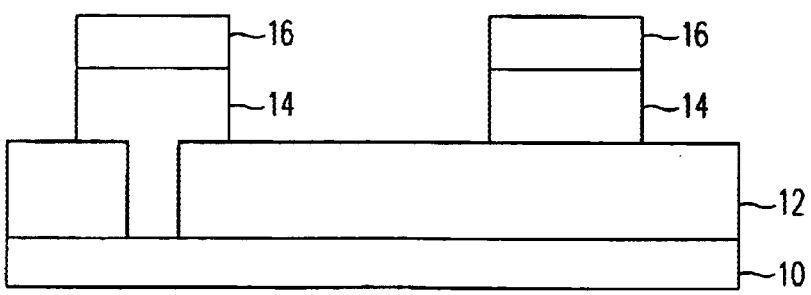
FIG. 1E
(Conventional)

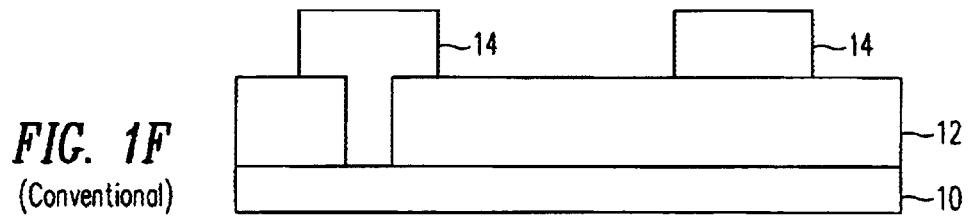
FIG. 1F
(Conventional)
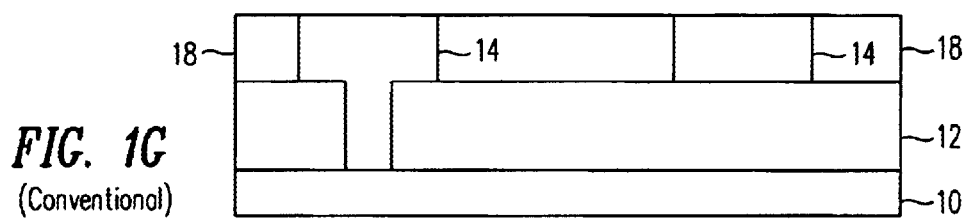
FIG. 1G
(Conventional)
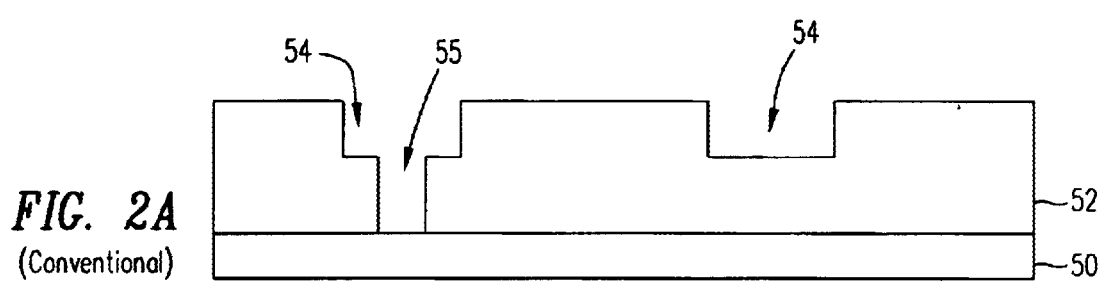
FIG. 2A
(Conventional)
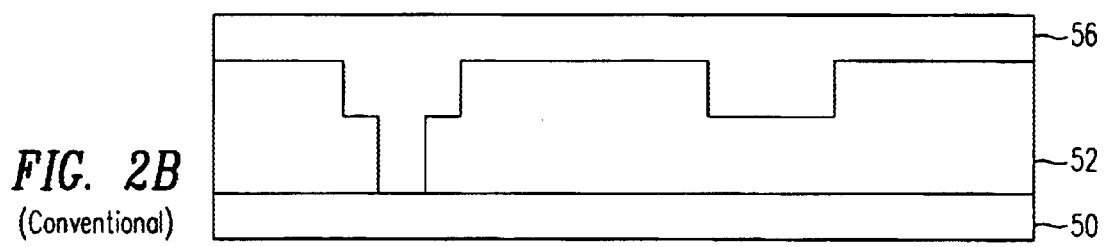
FIG. 2B
(Conventional)
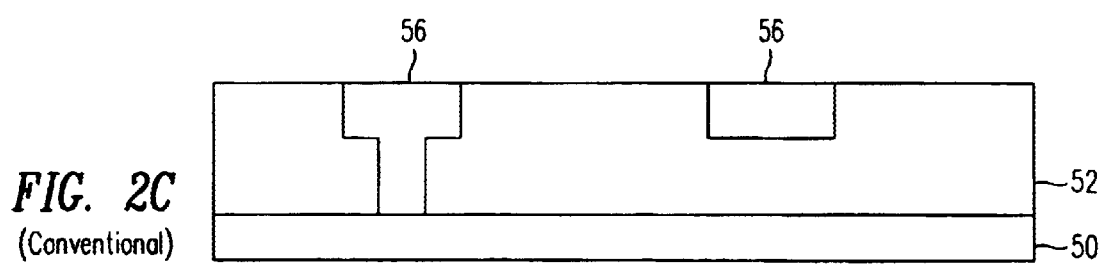
FIG. 2C
(Conventional)

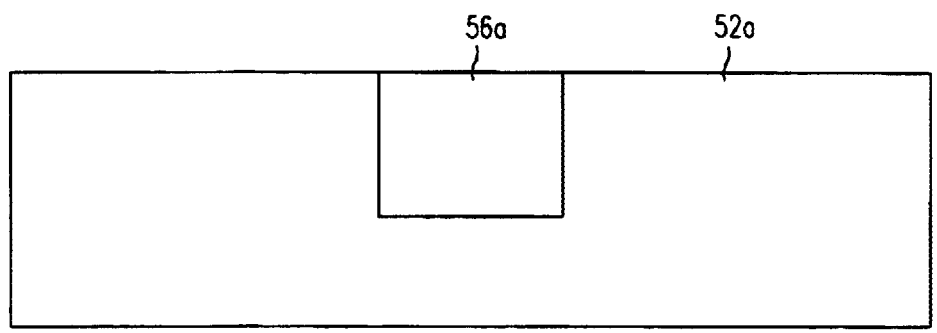
FIG. 3
(Conventional)
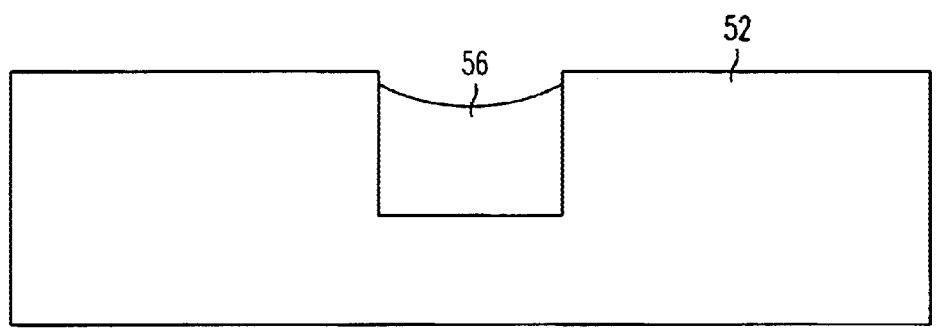
FIG. 4
(Conventional)

METHOD OF MEASURING DISHING USING RELATIVE HEIGHT MEASUREMENTS

FIELD OF THE INVENTION

The present invention relates to measuring properties in opaque features, and in particular to a metrology procedure to measure dishing that occurs in opaque features, e.g., after a chemical-mechanical polishing (CMP) step.

BACKGROUND

The metal interconnect of integrated circuits has conventionally been realized by blanket depositing a layer of metal on a planar insulating surface. Portions of the metal layer are subsequently removed in a photolithographically patterned etching step to form the resulting metal conductors. Conventional integrated circuits have generally employed somewhat resistive metal, such as aluminum, or metal alloys for the metal interconnect.

FIGS. 1A through 1G show a cut-away view of the conventional fabrication of an aluminum interconnect. As shown in FIG. 1A, a relatively planar surface layer 10, which may be, e.g., a silicon substrate, is covered with a dielectric layer 12, e.g., an oxide layer, which is patterned and etched. An aluminum layer 14, which may be an aluminum alloy, is blanket deposited over the dielectric layer 12, as shown in FIG. 1B. A photoresist layer 16 is deposited over the aluminum layer 14 (FIG. 1C), and is exposed and developed resulting in the structure shown in FIG. 1D. The aluminum layer 14 is then etched, e.g., using a plasma etching technique, resulting in the structure shown in FIG. 1E. The remaining photoresist layer 16 is removed resulting in the structure shown in FIG. 1F. After these steps are completed, the surface is composed of metal lines with near vertical sidewalls above the surface of the dielectric layer 12, as shown in FIG. 1F. Subsequently, dielectric layers are deposited and etched over the metal lines to yield a dielectric layer 18 with a planarized surface, e.g., for the next metal layer, as shown in FIG. 1G.

A major change is being implemented in semiconductor processing by switching from aluminum to copper metallization. Copper is preferred to aluminum due to its lower resistivity and better electromigration resistance. Unfortunately, copper is difficult to etch and the switch from aluminum to copper has forced a change in the basic metallization process. Copper cannot simply be substituted for aluminum in the metallization process because plasma etching of copper is more difficult than plasma etching of aluminum (due to the lack of volatile copper halogen compounds). Additionally, if copper is allowed to directly contact the dielectric materials, it can rapidly diffuse through dielectric materials and contaminate the semiconductor devices.

Thus, a "damascene" process has been developed whereby copper can be used as the interconnect metal. Rather than blanket depositing the interconnect metal on a substantially planar insulating substrate and then etching away parts of the metal layer to leave the conductors, trenches are formed in an insulating material. A composite layer of a diffusion barrier, nucleation layer and copper are then blanket deposited over the entire surface of the insulating substrate such that the trenches are filled. Chemical mechanical polishing is then used to planarize the integrated circuit surface and thereby polish away all the metal that is not in the trenches. The result is metal conductors disposed in trenches and a globally planarized surface.

FIGS. 2A through 2C show a cut-away view of the conventional fabrication of a copper interconnect. As shown in FIG. 2A, a relatively planar surface layer 50, which may be, e.g., a silicon substrate, is covered with a dielectric layer 52, e.g., an oxide layer, which is patterned and etched. The dielectric layer 52 may be patterned and etched in multiple steps in order to produce trenches 54 and via 55. A diffusion barrier layer (not shown), nucleation layer (not shown), and copper layer 56 are blanket deposited over the dielectric layer 52 such that the trenches 54 and via 56 are filled, as shown in FIG. 2B. A chemical mechanical polishing step is then used to planarize the surface of the copper layer 56 (along with the diffusion barrier layer and nucleation layer) with dielectric layer 52, resulting in the structure shown in FIG. 2C.

The ideal copper CMP process removes the copper, nucleation layer and diffusion barrier from the surface of the dielectric while leaving behind the copper, nucleation layer and diffusion barrier in the trenches and contacts or vias. The ideal result would be a globally planarized surface with no vertical height change over the entire wafer surface. FIG. 3 shows the ideal resulting structure with a planar surface composed of a dielectric region 52a and idealized copper region 56a. Global planarity is desirable because of the depth of field requirements associated with the lithographic steps. Significant height variations on the surface will compromise the photoresist processing steps and subsequently the etching and metallization processes. Height variations also imply undesirable variations in the copper thickness and metal line resistance.

Unfortunately, because of the complexities associated with the CMP process, global planarity is not achievable. An artifact of the CMP processes in copper metallization results from the copper and dielectric material having different polishing rates, resulting in what is known as "dishing". FIG. 4 shows a cut-away side view of the typical resulting structure after the CMP process, in which the surface of the copper region 56 is lower than the surrounding dielectric region 52. It should be understood that FIG. 4 is for exemplary purposes and is not to scale. Dishing may generally be defined as the maximum height difference between the metal region 56 and the adjacent dielectric region 52 after CMP processing.

Another artifact caused by the CMP process, as known to those of ordinary skill in the art, is "dielectric erosion," i.e., the dielectric regions exhibit a change in height over the surface of the wafer. This variation is related to the local density of metal features. Areas of low metal density exhibit the highest dielectric surface regions whereas areas of high metal density result in lower dielectric surface regions. Dielectric erosion, however, is beyond the scope of this disclosure.

The processing of silicon wafers to form integrated circuit chips requires many complex processing steps. Each step must be carefully monitored and controlled to maximize the quality and yield of the final product. With the imminent replacement of aluminum by copper to form the metallization layers on silicon wafers, new processes and metrology techniques must be developed and implemented.

Accordingly, what is needed is an economical, reliable, rapid, precise and accurate metrology procedure that will characterize and control the individual process steps in the copper metallization process and specifically that will address dishing that results from certain polishing methods, such as the CMP process.

SUMMARY

A metrology process, in accordance with the present invention, measures the dishing of a first feature, e.g., an opaque or metal line, that is surrounded by a second feature, e.g., a dielectric layer, on a production substrate by measuring the relative height of a plurality of first features having differing widths with respect to the second feature and adjusting the relative height to represent dishing based on at least one calibration point, which correlates a line width with a dishing value. The opaque feature may be, for example, a metal or metal alloy line containing, e.g., copper, aluminum, or tungsten, while the relatively transparent feature is a dielectric material. The metrology process is useful, for example, after the metal and dielectric materials undergo a polishing process, e.g., CMP, to approximately planarize the surface. The method includes generating a set of calibration data that correlates the magnitude of dishing with the width of a metal line. In addition, different sets of calibration data may be generated based on different parameters used in the polishing process. The relative height of the metal line with respect to the dielectric layer is measured using, e.g., a differential interferometer or a laser displacement sensor. The relative height is, correlated with line width, e.g., as a plotted curve. Because the relative height is not the same as dishing, due to complexities in phase shifting that occurs, e.g., in dielectric material, the relative height curve must be adjusted to correlate line width with dishing. Thus, the correlation between relative height and line width is adjusted to produce the correlation between dishing and line width using at least one calibration data point. For example, the plotted curve is adjusted by extrapolating the curve to include the calibration line width. The curve is then shifted so that the calibration line width is aligned with the calibration dishing value. The magnitude of dishing may then be determined for any line width on the curve, e.g., from the calibration line width to the maximum line width measured as a relative height. The curve may be further extrapolated to include any desired line width so that the magnitude of dishing may be determined for that desired line width.

The calibration data is produced by providing a sample substrate having different widths of metal lines. The sample substrate is processed in a manner similar to that of the production substrate to produce dishing in the metal lines. Thus, for example, the sample substrate is polished using a CMP process. The dishing of the metal lines is then directly measured using, e.g., an atomic force microscope or a contact profilometer. A relatively narrow isolated line, with an associated small amount or zero dishing is used as the calibration point. Additional sets of calibration curves may be generated using different parameter settings for the CMP process.

In another embodiment of the present invention, the relative heights of two different features, e.g., metal lines, are measured with respect to the surrounding feature, e.g., dielectric material. The two relative height measurements are then used to provide a relative measurement of dishing. For example, the difference between the two relative height measurements may be used as the relative measurement of dishing. The relative measurement of dishing may then be used to compare similar relative measurements of dishing on later production wafers.

BRIEF DESCRIPTION OF THE DRAWINGS

FIGS. 1A through 1G show a cut-away view of the conventional fabrication of an aluminum interconnect.

FIGS. 2A through 2C show a cut-away view of the conventional fabrication of a copper interconnect.

FIG. 3 shows a cut-away view of the ideally planar metal and dielectric regions resulting from a polishing process.

FIG. 4 shows a cut-away view of the typical resulting structure after a CMP process showing dishing of the metal region.

FIG. 1B shows the intersection of the extrapolated X line width of FIG. 11A with the horizontal line corresponding to the X line width (−5 nm).

DETAILED DESCRIPTION

A metrology process, in accordance with the present invention, determines the amount of dishing of a feature on the surface of a flat substrate by measuring the relative height of the feature versus another feature, e.g., a surrounding dielectric, and using calibration data to correlate the relative height to the actual amount of dishing. This method is useful on substrates composed of more than one material, such as a metal (or metal alloy) and a dielectric material, and may be used for semiconductor wafers, flat panel displays, or other similar flat substrates. The present metrology procedure can quantify dishing to fully characterize the shape of the surface after, e.g., a CMP process, in a fast, precise, accurate, reliable and economical manner.

While it is preferred to directly measure the actual height difference between the metal and adjacent dielectric regions to quantify the dishing, direct measurement of the surface height of the copper feature and the dielectric feature with a form of radiation is difficult because these two materials respond in a complex manner to radiation. The copper material is essentially opaque to most forms of radiation and produces a material specific phase shift, while the dielectric material is partially transparent to most forms of radiation that are used for measurement purposes and also modifies the phase response in a complex manner. Layers or features buried in the dielectric layer may also interfere with reflected signals making analysis of the dielectric surface difficult. Consequently, a measurement of the height of the copper material relative to the surrounding dielectric will not be an accurate measure due to the complex modification of the phase shift of the dielectric material. Accordingly, a measurement of the relative height of the copper material with respect to the dielectric material must be appropriately adjusted to compensate for complex phase shifts.

While the present disclosure discusses the measurement of dishing of an opaque or metal material that is surrounded with a transparent or dielectric material, it should be understood that the present invention may be used to measure the dishing of a first feature surrounded by a second feature, where the first and second features both modify the phase shift in a complex manner. Thus, for example, the first and second features may both be transparent. By measuring only the first feature, complexities associated with measuring the signal from the second feature are advantageously avoided.

Figure 5:
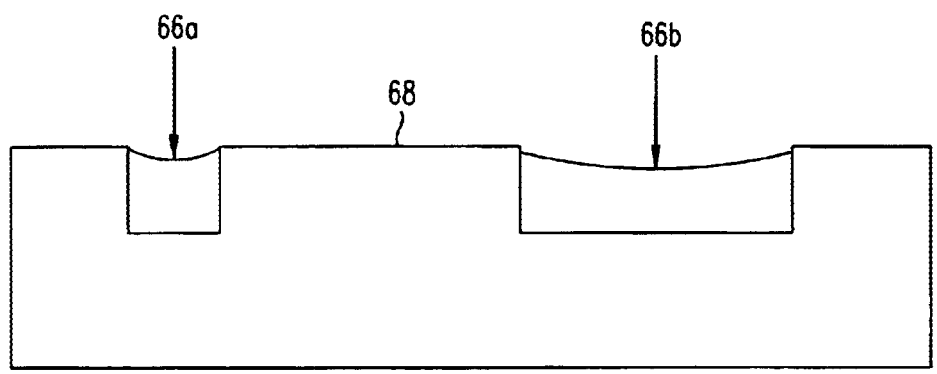
FIG. 5 shows a cut-away view of the typical resulting structure after a CMP process showing a profile of the dishing of a narrow, isolated metal line and a wide, isolated metal line.

FIG. 5 shows a cut-away view of the typical resulting structure after a CMP process showing a profile of the dishing of a narrow, isolated metal line 66a and a wide, isolated metal line 66b. As shown in FIG. 5, the magnitude of dishing increases with the size of the metal feature. The greatest amount of dishing occurs at the center of the metal features 66a and 66b, i.e., the maximum distance from the surrounding dielectric area, while the least amount of dishing occurs adjacent to the dielectric region 68. Consequently, the metal feature 66 surface forms a complex, concave shape. As can be seen in FIG. 5, a wide line 66b will have a greater amount of dishing than a narrow line 66a. Further, if the width of the line is sufficiently narrow, there will be no dishing observed. Thus, dishing is a function of parameters associated with the CMP process as well as the line width.

The metrology process, in accordance with the present invention, determines the amount of dishing of a first feature, referred to, for the sake of simplicity, as a metal line, by measuring the relative height of the metal line with respect to a second feature, referred to, for the sake of simplicity, as the surrounding dielectric, for one or more line widths and adjusting those measurements to compensate for any complex phase shifting that occurred. The measurements of the relative heights, for example, may be plotted in graphical form. Calibration data may then be used to adjust the plotted measurements to provide an accurate measurement of the dishing of a line width between the calibration point and the maximum line width for which was taken a relative height measurement.

Figure 6:
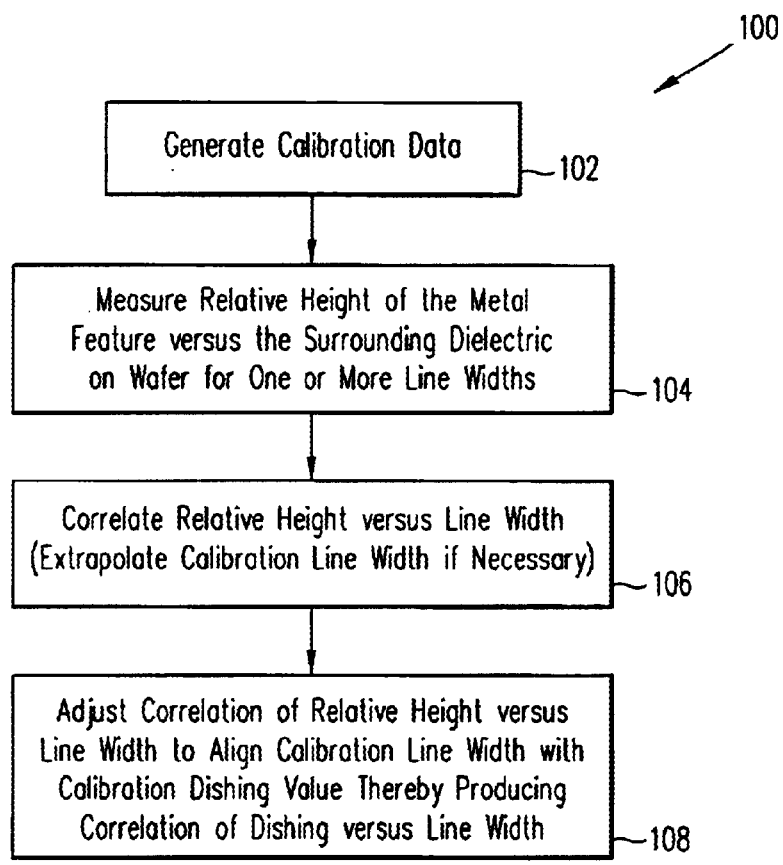
FIG. 6 is a flow chart describing the metrology process of the present invention.

FIG. 6 is a flow chart 100 describing the metrology process of the present invention. As shown in FIG. 6, calibration data is generated (block 102). The calibration data is used to correlate the amount of dishing with the width of a line. One or more calibration data points may be generated. In one embodiment, the calibration data point is a line width of 0 μm, which is assumed to have no dishing, (referred to herein as the "zero line width value"). With use of the zero line width value, no calibration measurements need to be generated because it is assumed that at zero line width the dishing will be zero.

Another calibration point, which must actually be measured on a sample substrate, is the maximum width of an isolated line at which dishing is zero or non-existent (referred to herein as "the zero dishing line width"). Another calibration point is the width of an isolated line at which some dishing, i.e., non-zero dishing, occurs (referred to herein as the "minimum dishing line width"). Another calibration point is at a specific line width, and the magnitude of dishing is not necessarily close to zero (referred to herein as the "X line width").

The measured data for these calibration points could be generated using an atomic force microscope or contact profilometer to measure a wafer that was processed with a known set of CMP parameters. The generation of the calibration data is discussed in more detail below in reference to FIG. 12. The calibration data may be stored, e.g., in a database, and are accessible during the metrology process.

The relative height of a metal line relative to the surrounding dielectric for one or more line widths of isolated features on the production substrate is then measured (block 104). The relative height measurements of the metal lines versus the surrounding dielectric are not equivalent to the actual dishing due to complexities associated with the phase shifts associated with reflections from the two different types of materials in the metal line and the surrounding dielectric. For example, when measuring copper dishing, differential interferometer measurements will be modified by the phase shift associated with the copper and the different phase shift associated with the dielectric film stack. Consequently, the measurement will not accurately reflect the actual amount of dishing, but will only provide a relative height measurement.

The present invention is based on two basic assumptions. One assumption is that the phase shift associated with the first feature, i.e., the metal line, is constant. Thus, the phase shift must be known or measured at a sufficient frequency that ensures that it will remain constant in the area of measurement for an entire set of measurements. For example, the phase shift associated with polished, electrode-posited copper may be measured once a week on an ellipsometer. The second assumption is that the thickness of the second feature, i.e., the surrounding dielectric, must be constant over the areas to be measured to guarantee that the dielectric phase shift is constant. If the dielectric is composed of multiple layers, each layer must be relatively constant in thickness over the areas surrounding the metal features to be measured. This can be verified with a thin film measurement tool such as an ellipsometer or spectroscopic reflectometer.

Consequently, the relative height measurement must be taken over an area of the substrate that is limited in lateral dimensions to guarantee that the two assumptions are true. The measurements may be made over a typical lateral dimension of 500 microns (μm) to ensure that the two assumptions are valid. For example, if the thickness of the dielectric material varies by a total range of 6% for a 1 μm thick film over a 200 mm wafer, there would be a range of 60 nm between any two points on the wafer. Assuming the variation scales linearly, over a distance of 500 μm (400 times smaller), the variation would be 0.015% or 0.15 nm. A variation of 0.15 nm is small enough to satisfy the assumption of a constant thickness film over the lateral measurement dimensions.

The relative height of the metal line with respect to the surrounding dielectric is measured for a plurality of line widths of isolated metal features using an appropriate metrology device. One such metrology device is a differential interferometer. As is well known in the art, one type of differential interferometer works by splitting a laser beam into two orthogonally polarized components. Each spot then hits the sample at normal incidence with a predetermined spacing. After reflection from the surface of the sample, the two spots are recombined before hitting a detector. If there is a height difference between the two spots on the sample, there will be a relative change in the phase difference between the two spots upon recombining that will modify the amplitude of the signal hitting the detector. The measured phase shift can be converted to a relative height difference with a knowledge of the wavelength of the laser.

Another metrology device that may be used to measure the relative height of the metal line with respect to the surrounding dielectric material is a laser displacement sensor. As is well known in the art, a laser displacement sensor focuses a small laser spot onto the metal feature. The position of the reflected beam is then measured. This is repeated with the laser spot focused on the dielectric feature. The data then can be converted to a relative height.

Ideally, the height variation of metal features will be measured in areas on the wafer that are composed of the metal, e.g., copper or copper alloy layer, the dielectric layer in which the metal was inlaid and the underlying silicon substrate without additional features present between the copper layer and the substrate.

Figure 7:
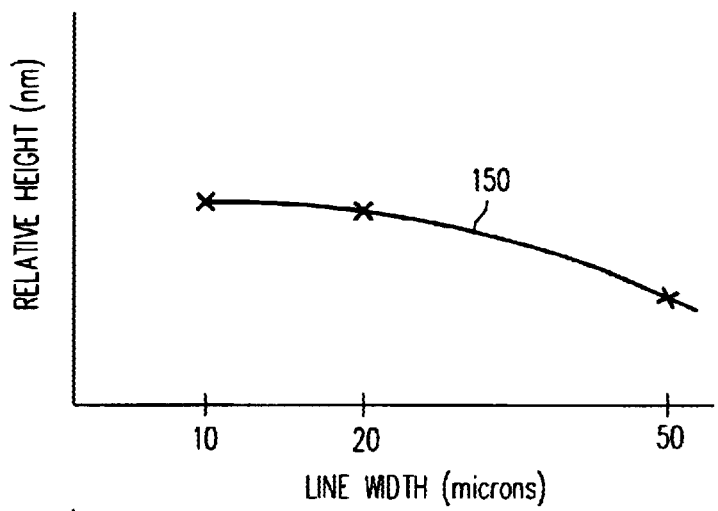
FIG. 7 shows the relationship of one or more relative height measurements as a function of the line width associated with the isolated metal feature.

The relative height measurements are correlated with the line widths (block 106). In one embodiment, the correlation is plotted as relative height versus the line width. FIG. 7 shows a relative height versus line width curve 150. Thus, for example, the heights for metal lines with widths of 10 $\mu$m, 20 $\mu$m and 50 $\mu$m were measured versus the surrounding dielectric material and then plotted as shown in FIG. 7. The height values on the ordinate are relative and, thus, are arbitrary. Of course, the correlation may be represented in other manners, e.g., mathematically.

The relative height versus line width curve 150 is extrapolated to one calibration line width if the calibration line width does not already fall on curve 150 (block 106 in FIG. 6). Thus, for example, the curve 150 may be extrapolated using the zero dishing as zero line width, the zero dishing line width, the minimum dishing line width or the X line width. The extrapolation of curve 150 to a calibration data point may be performed using various extrapolation methods well known to those of ordinary skill in the art. If the data falls on a straight line, simple linear extrapolation may be employed. If the data falls on a curve, rational function extrapolation may be used as is well understood by those skilled in the art and as described, for example, in "Numerical Recipes, The Art of Scientific Computing", by Press, Flannery, Teukolsky and Vetterling, published by Cambridge University Press 1988, page 83, which is incorporated herein by reference. Of course, if the calibration line width already fall on curve 150, no extrapolation is necessary.

Figure 8A:
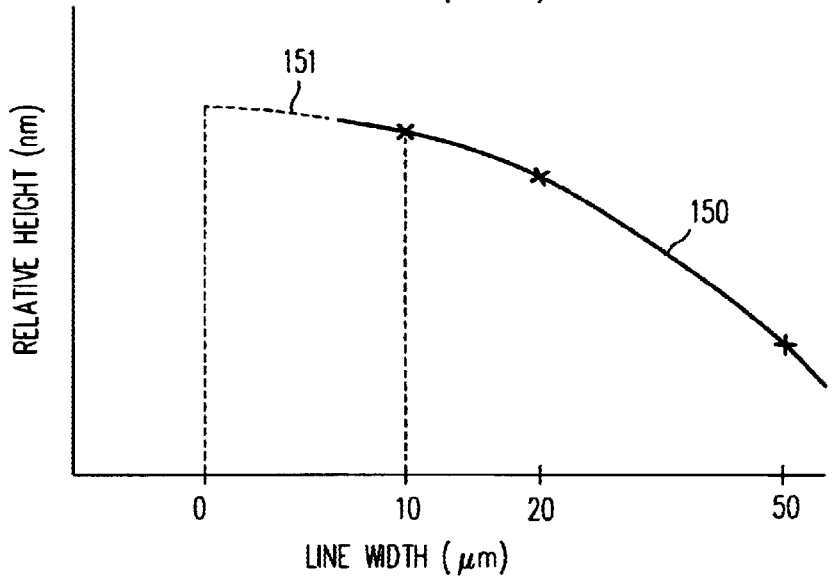
FIG. 8A shows the curve in FIG. 7 being extrapolated to zero line width value, i.e., 0 $\mu$m.
Figure 9A:
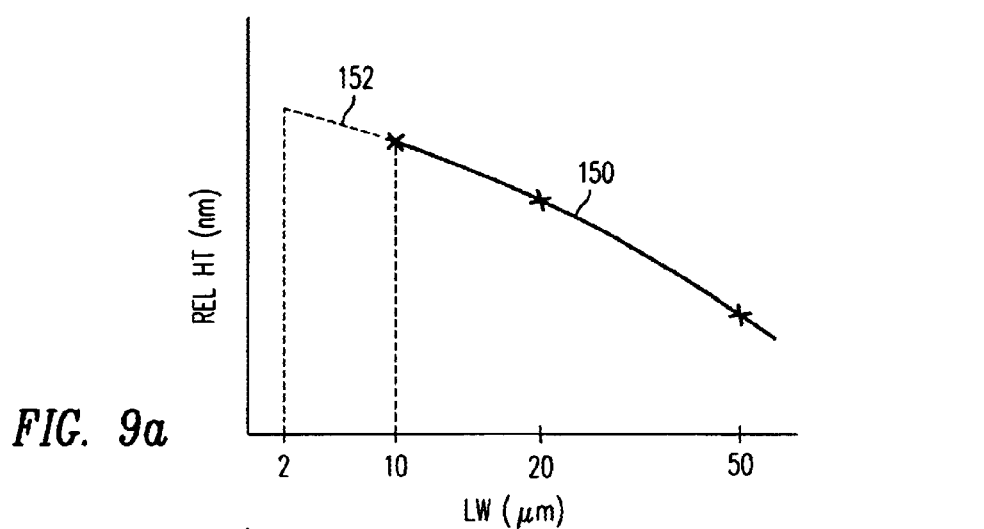
FIG. 9A shows the curve in FIG. 7 being extrapolated to the zero dishing line width value (shown as 2 $\mu$m in this figure).
Figure 10A:
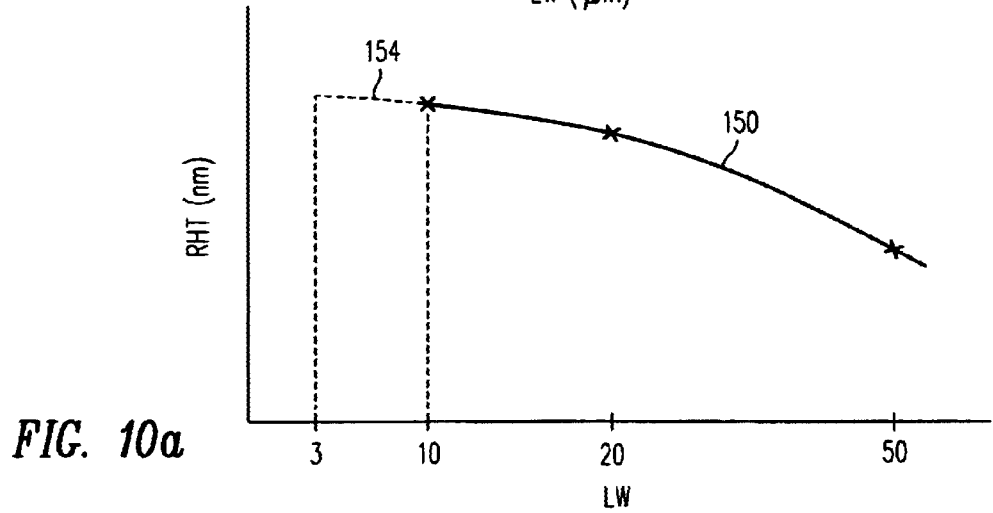
FIG. 10A shows the curve in FIG. 7 being extrapolated to the minimum dishing line width value (shown as 3 $\mu$m in this figure).
Figure 11A:
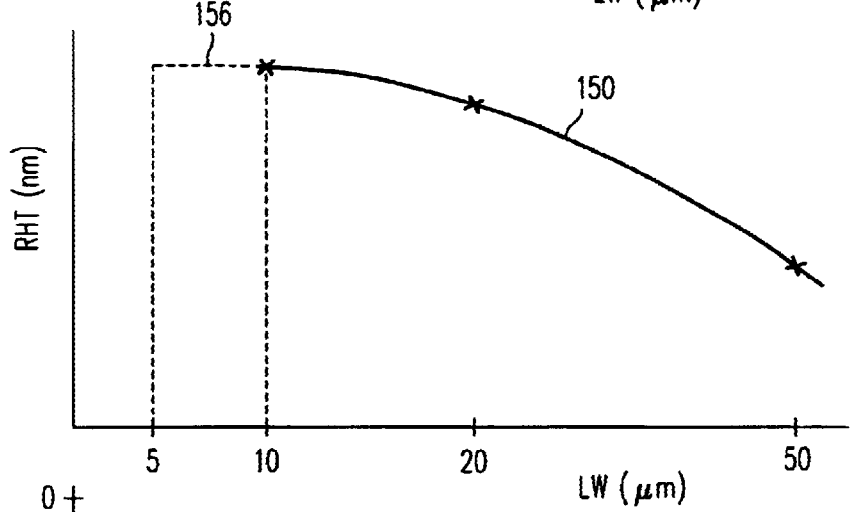
FIG. 11A shows the curve in FIG. 7 being extrapolated to the X line width, (shown as 5 $\mu$m in this figure).

FIG. 8a shows curve 150 extrapolated 151 to the zero line width value, i.e., 0 $\mu$m. FIG. 9a shows curve 150 extrapolated 152 using the zero dishing line width of, e.g., 2 $\mu$m. FIG. 10a shows curve 150 extrapolated 154 using the minimum dishing line width of, e.g., 3 $\mu$m. FIG. 11a shows curve 150 extrapolated 156 using the X line width of, e.g., 5 $\mu$m. It should be understood that the 2 $\mu$m, 3 $\mu$m and 5 $\mu$m line widths of the calibration data are for exemplary purposes and that the actual line widths used for the calibration data may differ. If extrapolation is not needed, the curve is unchanged from FIG. 7.

Figure 8B:
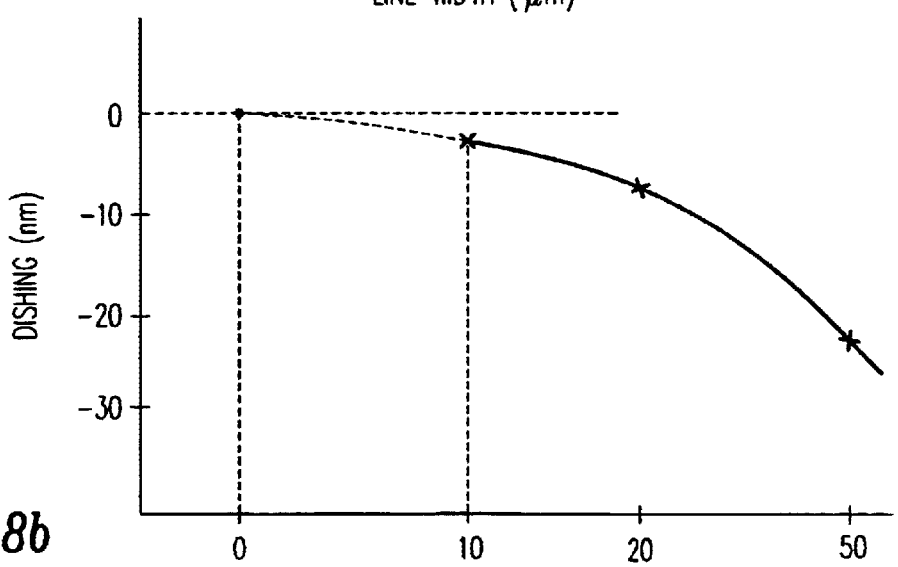
FIG. 8B shows the intersection of the extrapolated zero dishing line width of FIG. 8A with the horizontal line corresponding to zero dishing.
Figure 9B:
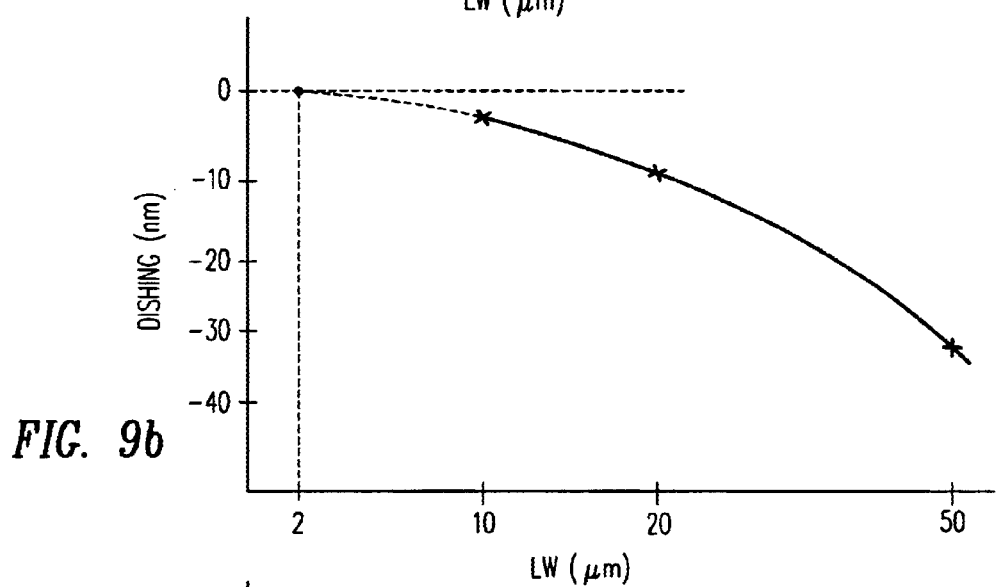
FIG. 9B shows the intersection of the extrapolated zero dishing line width of FIG. 9A with the horizontal line corresponding to zero dishing.
Figure 10B:
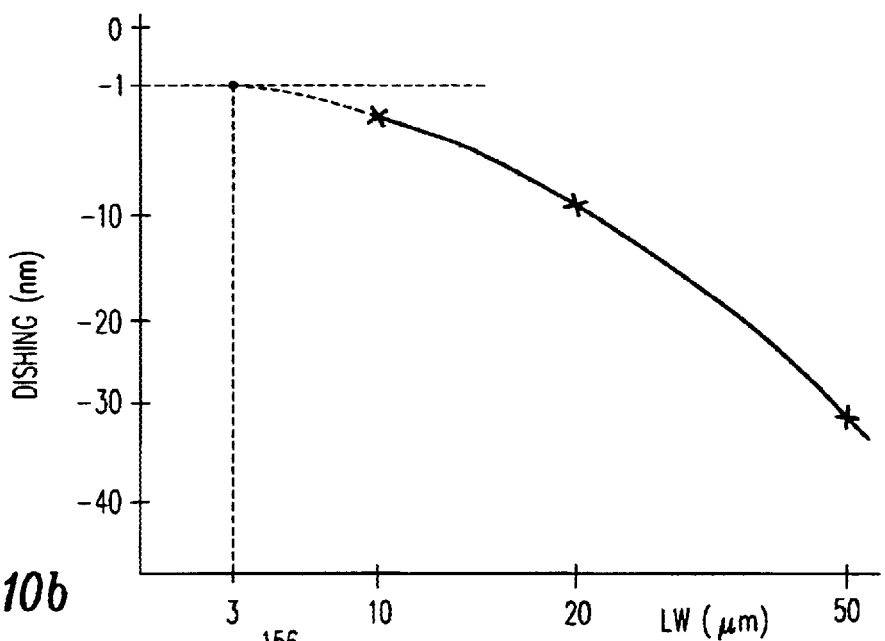
FIG. 10B shows the intersection of the extrapolated minimum dishing line width of FIG. 10A with the horizontal line corresponding to the minimum dishing value (−1 nm).
Figure 11B:
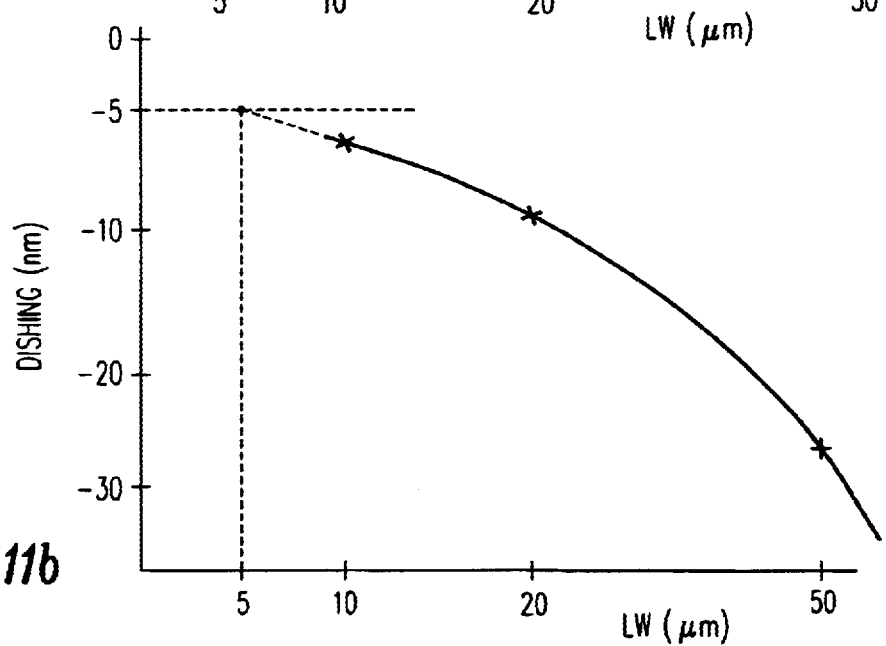

The correlation of relative height versus line width is then adjusted to align the calibration line width with the calibration dishing value, which produces a correlation of dishing versus line width (block 108 in FIG. 6). Thus, for example, the curve 150 is shifted to align the calibration data, i.e., the line width of the calibration point is aligned with the dishing value. As shown in FIG. 8b, the zero line width value intersects the zero dishing value. FIG. 9b shows the zero dishing line width, e.g., 2 $\mu$m, intersecting the horizontal line associated with zero dishing. FIG. 10b shows the intersection of the minimum dishing line width, e.g., 3 $\mu$m, with the horizontal line running through a dishing value of −1 nm. FIG. 11b shows the intersection of the X line width, e.g., 5 $\mu$m, with the horizontal line running through the dishing value for that calibration point, e.g., −5 nm. If the plot did not require extrapolation, i.e., the relative height was measured at, for example, 5 $\mu$m, the plot would look the same as FIG. 11b.

The axes on FIGS. 8b, 9b, 10b, and 11b are the metal feature line width versus actual dishing. If the magnitude of the slope decreases with extrapolation to smaller line widths, the actual values to be determined will be relatively insensitive to errors associated with the calibration data. Accordingly, while there may be some inaccuracy due to the limitations of metrology equipment or the basic assumptions, e.g., the zero line width has zero dishing, the actual dishing values of line widths of interest should be relatively insensitive to these errors. The actual dishing values can then be read from the plots in FIGS. 8b, 9b, 10b and 11b for the measured points or interpolated for any metal line width between the calibration line width and the widest line measured. Of course, dishing values for lines narrow than the calibration line width and wider than the widest line measured may be determined by appropriate extrapolation of the curve to beyond those values.

It should be understood that while the present disclosure describes physically plotting and extrapolating the curves of the relative height versus line width, this is intended to describe the mathematical manipulation of the data, for example, using a processor or microprocessor. Thus, the generation of the curve representing the relative height versus line width and subsequent adjustment of the curve to correlate the dishing versus line width may be performed mathematically.

Figure 12:
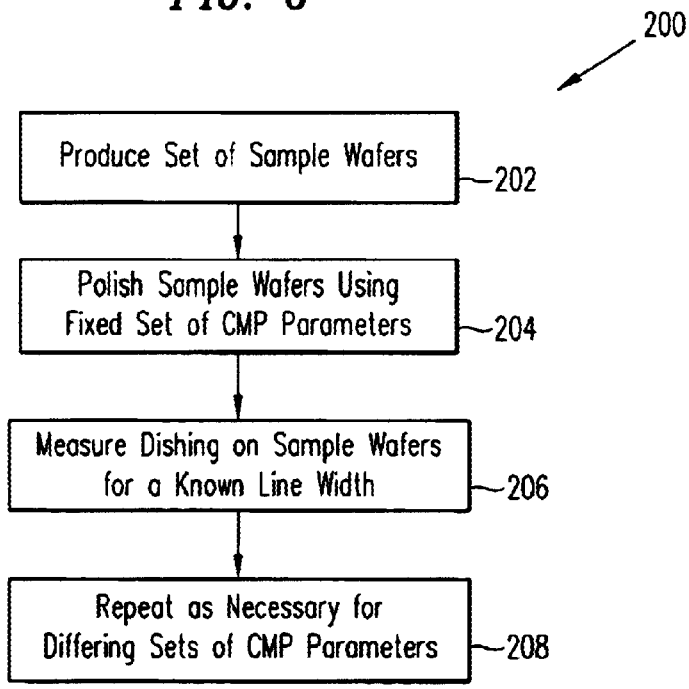
FIG. 12 is a flow chart describing the process of generating a set of calibration data to be used in accordance with the present invention.

FIG. 12 is a flow chart 200 describing the process of generating calibration data in accordance with an embodiment of the present invention. First, if the zero line width value is used as a calibration data point, the calibration data is generated based simply on the assumption that the zero line width has zero dishing. For other calibration data points, a set of sample wafers or substrates are produced (block 202). Each sample wafer should include a fixed set of parameters, such as different line widths, and ideally should be as close as possible to the production wafer that is to be measured. The sample wafers are polished using a fixed set of commonly used CMP parameters (block 204) or any other process that is causing dishing.

The dishing on the sample wafers is then independently measured using, e.g., a calibrated atomic force microscope, contact profilometer, or other appropriate device (block 206) for one or more line widths. Thus, as described above, the zero dishing line width, the minimum dishing line width and/or a X line width may be measured.

Additional sets of calibration data may be generated using different parameter settings for the CMP process (block 208). The calibration data should be generated with parameters as close as possible to the conditions associated with the production substrates to optimize the capability of the proposed metrology technique. Important CMP parameters that are related to the amount of dishing, for example, include the processing time as well as the ratio of the chemical to the mechanical components of polishing process, such as slurry chemistry and pad composition. The calibration data correlates a relatively small value of dishing with a relatively narrow isolated metal feature line width for a given set of CMP parameters. The calibration data may be stored, e.g., in a database and are accessible during the metrology process.

If desired, only one calibration point need be generated, depending on desired accuracy and, for example, hardware limitations. Thus, for example, the value of the zero dishing line width calibration point may be used as the most accurate and precise because the slope of the curve should be minimized at this dishing value. Any error that arises may be caused by the limited precision capability of the atomic force microscope or contact profilometer used for calibration. The zero line width value may be an acceptable replacement for the zero dishing line width, which advantageously avoids the need to produce and measure sample substrates.

The minimum dishing value line width, however, may be preferred because of the available locations of isolated metal features on the calibration wafer or because of hardware limitations associated with the atomic force microscope or contact profilometer. It would also minimize the amount of extrapolation required compared to data generated at smaller line widths. If the curvature of the relative height versus line width plot is minimal or non-existent, it may even be preferred to use the minimum dishing value line width compared to the zero dishing line width.

The larger dishing value X line width, e.g., 5 $\mu$m, may be less accurate and less precise than the smaller line width choices for calibration. Nevertheless, a reason for using this isolated metal line width value may once again be availability of such features on the sample, as well as being able to measure a 5 $\mu$m line on the calibration wafer with an atomic force microscope or contact profilometer and the same width line on the actual sample using, for example, a differential interferometer. Extrapolation of the relative heights as a function of line width would then not be needed. The entire relative height versus line width curve would just be shifted by the calibration amount.

Finally, it may meet the needs of a user to only know the difference between the dishing on one feature relative and the dishing on another feature. Thus, in accordance with another embodiment of the present invention, the relative dishing value of a narrow metal line may be measured and compared to the relative dishing value of another, e.g., wider, metal line. Advantageously, no calibration procedure is required. For example, if a differential interferometer with a 3 $\mu$m spot size could measure the height of a 5 $\mu$m wide line relative to the surrounding dielectric layer, that measurement could be subtracted from the height measurement of a wider, e.g., 50 $\mu$m, line relative to the surrounding dielectric. While the resulting number would not be an accurate measure of dishing, the number would be related to dishing. The user could then use the resulting number as a base line to compare other production wafers against. If the difference in relative height measurements of lines on a subsequent production wafer is different, there is an indication that the dishing values changed. Accordingly, the user will know that further analysis of the dishing is necessary.

Although the present invention is illustrated in connection with specific embodiments for instructional purposes, the present invention is not limited thereto. Various adaptations and modifications may be made without departing from the scope of the invention. For example, the inlaid metal features may be made of copper, aluminum, tungsten or any other appropriate metal or metal alloy, as well as non-metal material. While the present disclosure discusses the measurement of dishing of an opaque or metal material that is surrounded with a transparent or dielectric material, the present invention may also be used to measure the dishing of a first feature that is surrounded by a second feature, where the first and second features both modify the phase shift in a complex manner. Thus, for example, the first and second features may both be transparent. Further, while the lines are sometimes described as isolated in the present disclosure, it should be understood that the lines need not be completely isolated. For example, if the lines being measured have similar isolation characteristics, the present invention may be useful. Moreover, if the lines are not part of a densely packed array of lines, the present invention may be useful. The metrology process in accordance with the present invention is not limited to measuring dishing after a CMP process, but may be used after any process where dishing takes place. Moreover, it should be understood that metrology process may be used with wafers, flat panel displays or any other device in which the measurement of dishing is desirable. Further, while the disclosure shows that the relative height and line width measurements are plotted graphically, it should be understood that the data may be stored in a computer readable medium and manipulated mathematically using, e.g., an appropriate processor or microprocessor reading software, which may be written by one of ordinary skill in the art in light of the present disclosure. Therefore, the spirit and scope of the appended claims should not be limited to the foregoing description.

What is claimed is:

1. A method of measuring the dishing of a first feature that is surrounded by a second feature on a substrate, said method comprising:
   generating at least one calibration data point that correlates the amount of dishing associated with a specific line width;
   measuring the relative heights of a plurality of said first features relative to said second feature, wherein said plurality of said first features includes different line widths;
   plotting a curve representing said relative heights as a function of line width;
   shifting said curve to align said specific line width with said amount of dishing; and
   reading the actual dishing values at a desired line width from the shifted curve.

2. The method of claim 1, further comprising extrapolating said curve to the specific line width of said calibration data point.

3. The method of claim 1, wherein said measuring the relative heights of said opaque features is performed after a polishing process is used.

4. The method of claim 1, wherein said first feature is a metal feature and said second feature is a dielectric material.

5. The method of claim 4, wherein said metal feature comprises at least one of copper, aluminum, and tungsten.

6. The method of claim 1, wherein generating a set of calibration data comprises:
   providing a sample substrate having at least one first sample feature with a known width surrounded by a second sample feature;
   processing said sample substrate to produce dishing of said first sample feature; and
   measuring the actual dishing value of said first sample feature.

7. The method of claim 6, wherein said first sample feature has a width with which is associated zero dishing or a minimum amount of dishing.

8. The method of claim 6, wherein processing said sample substrates comprises polishing said sample substrate.

9. The method of claim 8, further comprising generating additional sets of calibration data for different polishing parameters.

10. The method of claim 6, wherein measuring the dishing of said first feature on said sample substrates comprises measuring the dishing using an atomic force microscope.

11. The method of claim 6, wherein measuring the dishing of said first feature on said sample substrates comprises measuring the dishing using a contact profilometer.

12. The method of claim 1, wherein measuring the relative height variation of said first feature with respect to said second feature comprises utilizing at least one of a differential interferometer or a laser displacement sensor.

13. The method of claim 1, further comprising extrapolating said curve to a desired line width prior to reading the actual dishing values at said desired line width from the shifted curve.

14. A method of determining dishing in a metal line, said method comprising:
  providing a substrate having a plurality of metal lines having differing widths embedded in a dielectric layer;
  measuring the relative height of a plurality of metal lines with respect to said dielectric material to provide a correlation between relative height and line width;
  adjusting the correlation between relative height and line width using at least one calibration point to produce a correlation between line width and dishing values, wherein said calibration point is a correlation of a calibration point line width and a calibration point dishing value.

15. The method of claim 14, wherein adjusting the correlation between relative height and line width comprises:
  plotting a curve of said relative heights versus line widths; and
  shifting said curve to align said calibration point line width with said calibration point dishing value.

16. The method of claim 15 further comprising extrapolating said curve to include said calibration point.

17. The method of claim 15, wherein said calibration point line width falls within said curve when plotting said curve of said relative heights versus line widths.

18. The method of claim 14, wherein measuring the relative height comprises utilizing at least one of a differential interferometer and a laser displacement sensor.

19. The method of claim 14, wherein said calibration point line width is zero line width and said calibration point dishing value is zero dishing.

20. The method of claim 14, further comprising determining the actual dishing value at a desired line width from the adjusted correlation between relative height and line width.

21. The method of claim 20, further comprising further comprising extrapolating the adjusted correlation between relative height and line width to said desired line width prior to determining the actual dishing value at a desired line width.

22. A method of determining dishing in a metal line, said method comprising:
  providing a substrate having a plurality of metal lines having differing widths embedded in a dielectric layer;
  measuring a first relative height of a first metal line with respect to said dielectric material;
  measuring a second relative height of a second metal line with respect to said dielectric material;
  using said first relative height and said second relative height to provide a relative measurement of dishing.

23. The method of claim 22, wherein using said first relative height and said second relative height comprises taking the difference between said first relative height and said second relative height to provide a relative measurement of dishing.

24. The method of claim 22, wherein said first metal line has a first width and said second metal line has a second width, said second width being greater than said first width.

25. The method of claim 22, further comprising using said relative measurement of dishing to compare against similar relative measurements of dishing on later produced substrates.

* * * * *